United States Patent
Chen et al.

(10) Patent No.: US 11,546,494 B2
(45) Date of Patent: Jan. 3, 2023

(54) CAMERA MODULE AND ELECTRONIC DEVICE HAVING BUFFER LAYER WITH THE OPTICAL FILTER

(71) Applicant: TRIPLE WIN TECHNOLOGY (SHENZHEN) CO. LTD., Shenzhen (CN)

(72) Inventors: Shin-Wen Chen, New Taipei (TW); Sheng-Jie Ding, Guangdong (CN); Jing-Wei Li, Guangdong (CN); Jian-Chao Song, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/515,694

(22) Filed: Nov. 1, 2021

(65) Prior Publication Data

US 2022/0247900 A1  Aug. 4, 2022

(30) Foreign Application Priority Data

Feb. 4, 2021 (CN) .......................... 202110157599.X

(51) Int. Cl.
*H04N 5/225* (2006.01)
*G02B 7/00* (2021.01)
*G02B 7/02* (2021.01)

(52) U.S. Cl.
CPC ........... *H04N 5/2254* (2013.01); *G02B 7/006* (2013.01); *G02B 7/021* (2013.01); *H04N 5/2253* (2013.01)

(58) Field of Classification Search
CPC ...................................................... G02B 7/006
See application file for complete search history.

(56) References Cited

U.S. PATENT DOCUMENTS

2020/0285132 A1* 9/2020 Chen ..................... G03B 30/00
2021/0168939 A1* 6/2021 Li ......................... H04N 5/2253

* cited by examiner

*Primary Examiner* — Gary C Vieaux
(74) *Attorney, Agent, or Firm* — ScienBiziP, P.C.

(57) ABSTRACT

A camera module includes a supporting seat, a filter, and a lens assembly. The supporting seat defines a window passing through the supporting seat. An annular flange extending from an inner wall of the window towards the central axis of the window. The filter is fixed on the annular flange. The lens assembly is fixed on the supporting seat. The lens assembly includes a lens holder and a lens disposed in the lens holder. A surface of the supporting seat facing the lens assembly is recessed to form at least two receiving slots surrounding the window. A buffer layer is disposed in each of the at least two receiving slots. An orthogonal projection of the lens on a plane of the buffer layer at least partially overlaps with the buffer layer, and lens is spaced apart from the filter.

16 Claims, 5 Drawing Sheets

CAMERA MODULE AND ELECTRONIC DEVICE HAVING BUFFER LAYER WITH THE OPTICAL FILTER

FIELD

The subject matter relates to imaging devices, and more particularly, to a camera module and an electronic device having the camera module.

BACKGROUND

Camera modules may include lens unit, lens holders, optical filters, sensors, and circuit boards. The resolution of the camera module becomes higher. As a result, the sizes of the component (such as the optical filter) in such camera module also increase. However, when the optical filter becomes larger, when the electronic device falls to the floor, an impact force that the lens unit applied to the lens holder increases the risk of breaking the optical filter.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
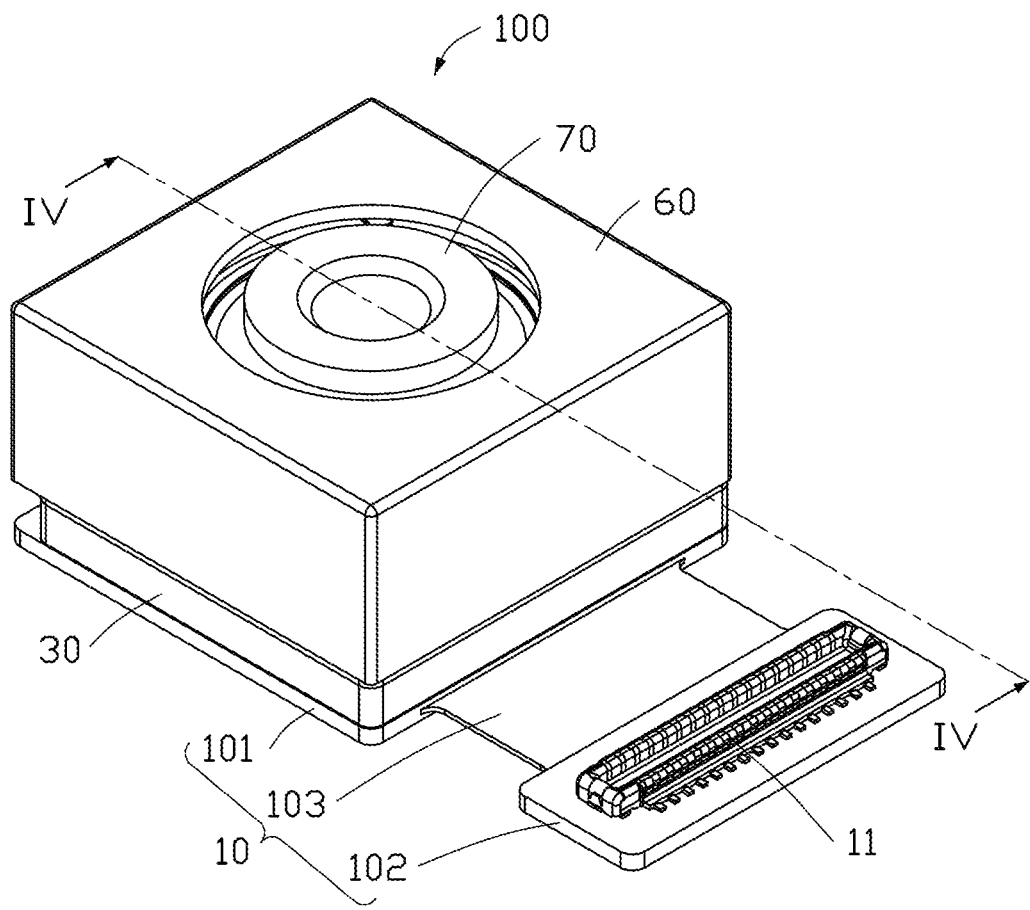
FIG. 1 is a diagrammatic view of a camera module according to an embodiment of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
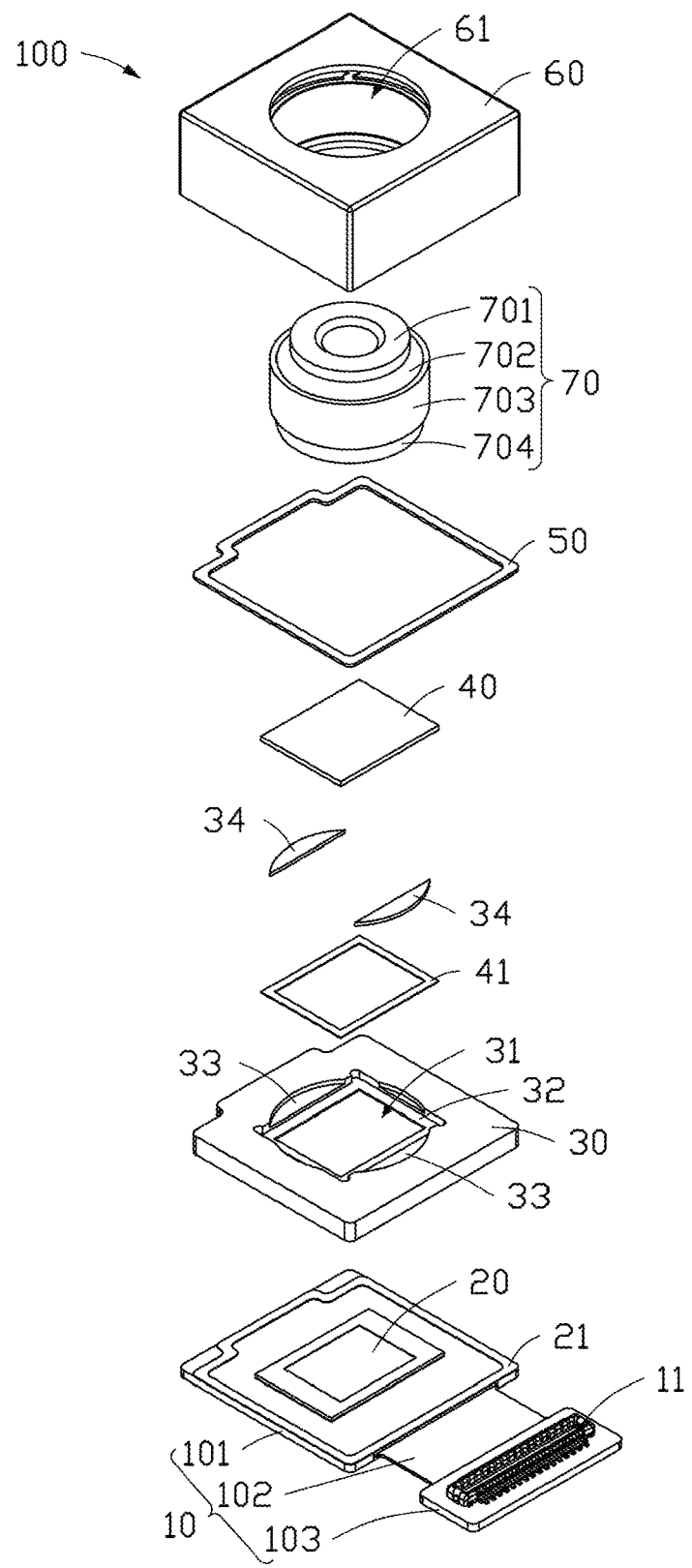
FIG. 2 is an exploded view of the camera module of FIG. 1.

FIGS. 1 and 2 illustrate an embodiment of a camera module 100 according to the present disclosure. The camera module 100 includes a circuit board 10, a supporting seat 30, a filter 40, a lens holder 60, and a lens 70.

The circuit board 10 can be a flexible circuit board, a rigid circuit board, or a flex-rigid circuit board. In an embodiment, the circuit board 10 is a flex-rigid circuit board, which includes a first rigid board portion 101, a second rigid board portion 102, and a flexible board portion 103 between the first rigid board portion 101 and the second rigid board portion 102. An electrical connection portion 11 is mounted on a surface of the second rigid board portion 102. The electrical connection portion 11 may be a connector or gold fingers.

A photosensitive chip 20 and a plurality of electronic components (not shown) are mounted on a surface of the first rigid board portion 101. The photosensitive chip 20, the electronic components, and the electrical connection portion 11 may be disposed on a same surface of the circuit board 10. The electronic components can be resistors, capacitors, diodes, transistors, relays, or electrically erasable programmable read-only memory (EEPROM).

Figure 3:
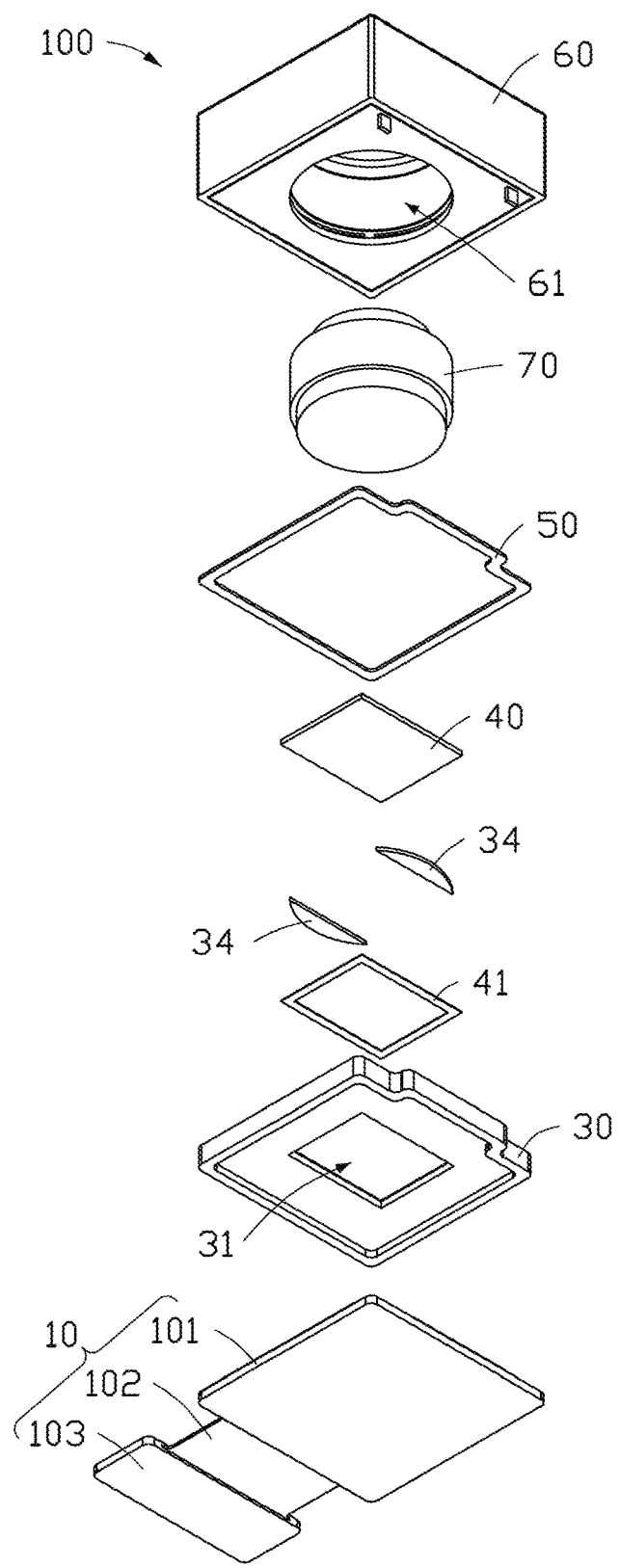
FIG. 3 is similar to FIG. 2, but showing the camera module from another angle.
Figure 4:
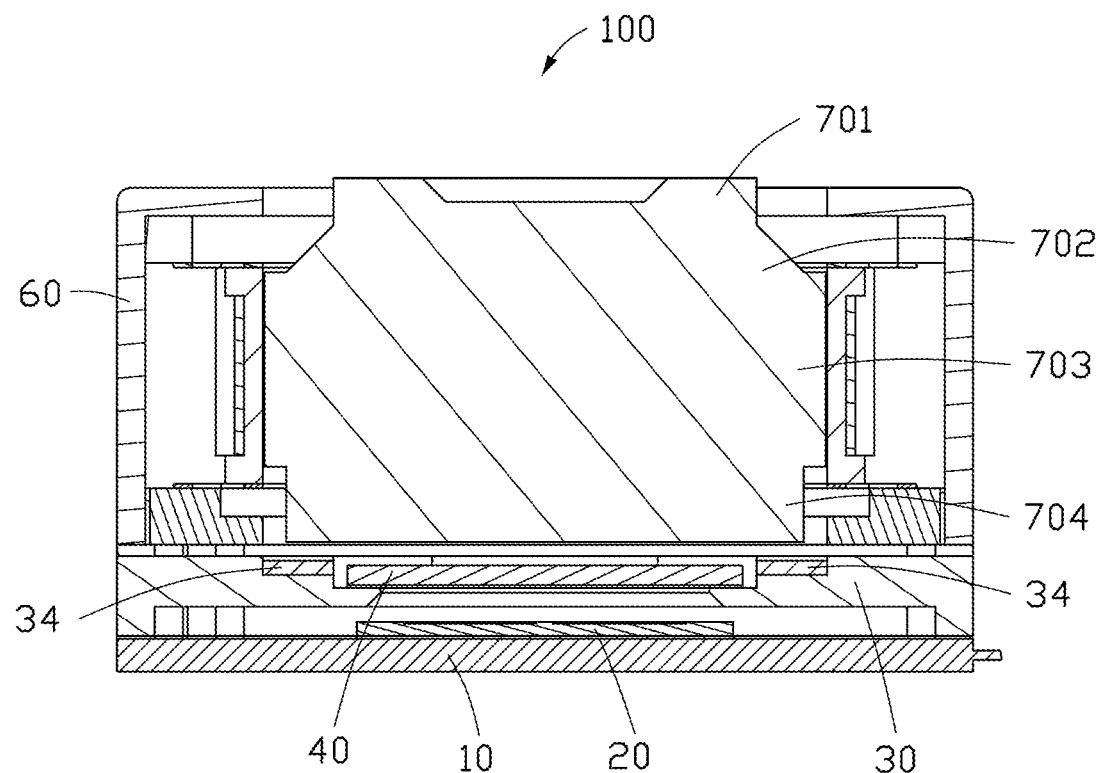
FIG. 4 is a cross-sectional view along a view line of IV-IV in FIG. 1.

Referring to FIGS. 3 and 4, in an embodiment, the supporting seat 30 may be mounted on the first rigid board portion 101 through a first adhesive layer 21. The supporting seat 30, the photosensitive chip 20, and the electronic components may be disposed on the same surface of the circuit board 10. The supporting seat 30 is substantially hollow rectangular. The supporting seat 30 defines a substantially rectangular window 31, which passes through the supporting seat 30. The window 31 has a central axis. An annular flange 32 extends from an inner wall of the window 31 towards the central axis. The filter 40 is fixed on a surface of the annular flange 32 away from the circuit board 10 through a second adhesive layer 41. The filter 40 faces the photosensitive chip 20.

A surface of the supporting seat 30 away from the circuit board 10 is recessed inward to form at least two receiving slots 33 surrounding the window 31. In an embodiment, two receiving slots 33 are included, which are disposed on opposite sides of the filter 40. In other embodiments, the number of the receiving slots 33 may be changed as needed.

In an embodiment, each of the receiving slots 33 is in a shape of a semicircle or a rectangle. In other embodiments, the shape the receiving slots 33 may be changed as needed.

A buffer layer 34 is disposed in each of the receiving slots 33. A surface of the buffer layer 34 away from the circuit board 10 is no higher than the surface of the supporting seat 30 away from the circuit board 10. The buffer layer 34 is made of a soft material. In an embodiment, the buffer layer 34 is made of an elastic material such as rubber.

The lens holder 60 is mounted on the supporting seat 30 through a third adhesive layer 50. The lens holder 60 may be substantially rectangular. The lens holder 60 defines a receiving hole 61. In an embodiment, the lens holder 60 is made of metal or plastic.

Referring to FIGS. 2 and 4, the lens 70 is disposed in the receiving hole 61 of the lens holder 60. An orthogonal projection of the lens 70 on a plane of the buffer layers 34 at least partially overlaps with the buffer layers 34. The lens 70 is spaced from the filter 40. The lens 70 and the lens holder 60 may be integrally formed or assembled together. The lens 70 and the lens holder 60 together form a lens assembly. The lens 70 includes a first lens portion 701, a second lens portion 702, a third lens portion 703, and a fourth lens portion 704. The first lens portion 701, the second lens portion 702, the third lens portion 703, and the fourth lens portion 704 are connected in that order. Diameters of the first lens portion 701, the second lens portion 702, and the third lens portion 703 increase successively, and a diameter of the fourth lens portion 704 is smaller than the diameter of the third lens portion 703. In an embodiment, the diameter of the second lens portion 702 increases gradually from the direction from the first lens portion 701 to the second lens portion 702.

Figure 5:
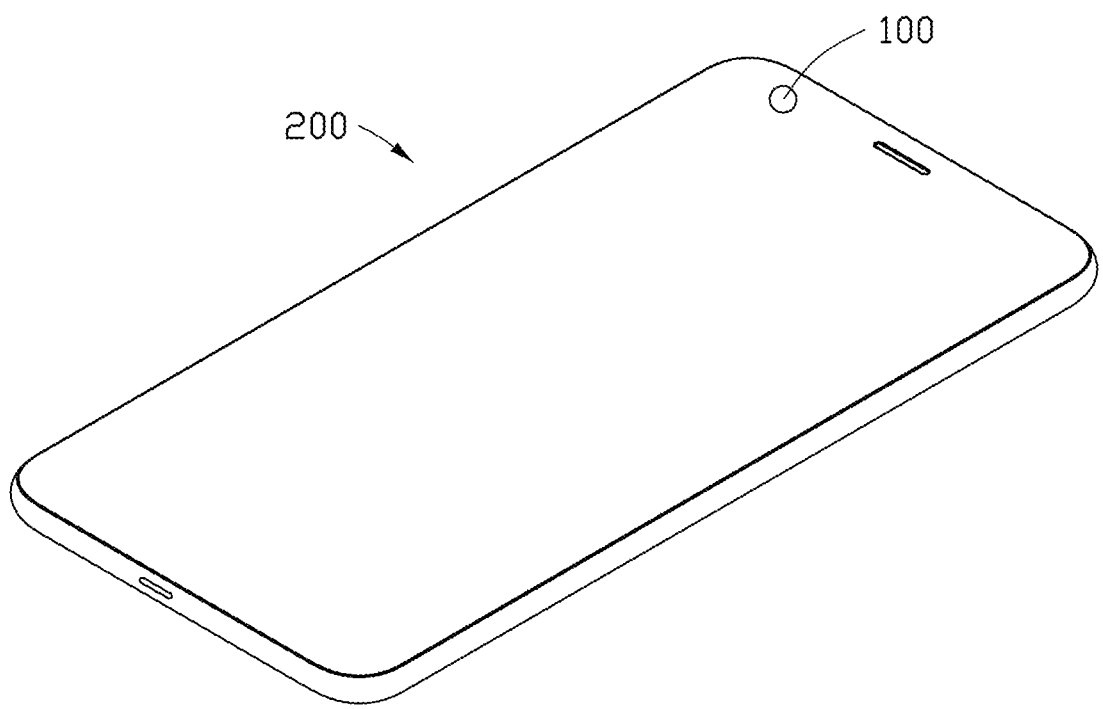
FIG. 5 is a diagrammatic view of an electronic device according to an embodiment of the present disclosure.

FIG. 5 illustrates an embodiment of an electronic device 200 including the camera module 100. The electronic device 200 may be a mobile phone, a tablet computer, or a personal digital assistant (PDA).

With the above configuration, when the camera module 100 drops to a surface, the buffer layers 34 can buffer the impact force generated between the lens 70 and the supporting seat 30, so as to protect the filter 40 and prevent the filter 40 from being broken.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A camera module comprising:
    a supporting seat defining a window extending through the supporting seat, the window defining an imaginary central axis, an annular flange extending from an inner wall of the window towards the imaginary central axis;
    a filter fixed on the annular flange; and
    a lens assembly fixed on the supporting seat, the lens assembly comprising a lens holder and a lens disposed in the lens holder,
    wherein a surface of the supporting seat facing the lens assembly is recessed to form at least two receiving slots surrounding the window, a buffer layer is disposed in each of the at least two receiving slots, an orthogonal projection of the lens on a plane of the buffer layer at least partially overlaps with the buffer layer, and lens is spaced apart from the filter.

2. The camera module of claim 1, wherein the buffer layer is made of an elastic material.

3. The camera module of claim 1, wherein the at least two receiving slots are disposed on opposite sides of the filter.

4. The camera module of claim 1, wherein each of the at least two receiving slots is semicircular or rectangular.

5. The camera module of claim 1, wherein a surface of the buffer layer facing the lens assembly is no higher than the surface of the supporting seat facing the lens assembly.

6. The camera module of claim 1, further comprising a circuit board, wherein the supporting seat is mounted on the circuit board.

7. The camera module of claim 6, further comprising a photosensitive chip, wherein the photosensitive chip is mounted on the circuit board and faces the filter, the supporting seat and the photosensitive chip are on a same surface of the circuit board.

8. The camera module of claim 1, wherein the lens comprises a first lens portion, a second lens portion, a third lens portion, and a fourth lens portion connected in that order, diameters of the first lens portion, the second lens portion, and the third lens portion increases successively, and a diameter of the fourth lens portion is smaller than the diameter of the third lens portion.

9. An electronic device, comprising:
    a camera module, comprising:
        a supporting seat defining a window extending through the supporting seat, the window defining an imaginary central axis, an annular flange extending from an inner wall of the window towards the imaginary central axis;
        a filter fixed on the annular flange; and
        a lens assembly fixed on the supporting seat, the lens assembly comprising a lens holder and a lens disposed in the lens holder,
    wherein a surface of the supporting seat facing the lens assembly is recessed to form at least two receiving slots surrounding the window, a buffer layer is disposed in each of the at least two receiving slots, an orthogonal projection of the lens on a plane of the buffer layer at least partially overlaps with the buffer layer, and lens is spaced apart from the filter.

10. The electronic device of claim 9, wherein the buffer layer is made of an elastic material.

11. The electronic device of claim 9, wherein the at least two receiving slots are disposed on opposite sides of the filter.

12. The electronic device of claim 9, wherein each of the at least two receiving slots is semicircular or rectangular.

13. The electronic device of claim 9, wherein a surface of the buffer layer facing the lens assembly is no higher than the surface of the supporting seat facing the lens assembly.

14. The electronic device of claim 9, wherein the camera module further comprises a circuit board, the supporting seat is mounted on the circuit board.

15. The electronic device of claim 14, wherein the camera module further comprises a photosensitive chi mounted on the circuit board and faces the filter, the supporting seat and the photosensitive chip are on a same surface of the circuit board.

16. The electronic device of claim 9, wherein the lens comprises a first lens portion, a second lens portion, a third lens portion, and a fourth lens portion connected in that order, diameters of the first lens portion, the second lens portion, and the third lens portion increases successively, and a diameter of the fourth lens portion is smaller than the diameter of the third lens portion.

* * * * *